(12) United States Patent
Agin

(10) Patent No.: US 7,146,135 B2
(45) Date of Patent: Dec. 5, 2006

(54) METHOD AND ADJUSTING TRANSMISSION TIMES IN A MOBILE RADIO SYSTEM

(75) Inventor: Pascal Agin, Sucy en Brie (FR)

(73) Assignee: Alcatel, Paris (FR)

( * ) Notice: Subject to any disclaimer, the term of this patent is extended or adjusted under 35 U.S.C. 154(b) by 728 days.

(21) Appl. No.: 09/824,049

(22) Filed: Apr. 3, 2001

(65) Prior Publication Data

US 2001/0029169 A1 Oct. 11, 2001

(30) Foreign Application Priority Data

Apr. 7, 2000 (FR) .......................... 00 04458

(51) Int. Cl.
*H04B 1/00* (2006.01)
*H04B 7/00* (2006.01)
*H04B 1/40* (2006.01)
*H04J 3/06* (2006.01)

(52) U.S. Cl. .............. 455/69; 455/68; 455/88; 370/350; 370/516

(58) Field of Classification Search .......... 455/522, 455/502, 88, 67.11, 442, 67.16, 436, 68, 419; 370/331, 335, 342, 350, 324, 516, 517, 518, 370/519

See application file for complete search history.

(56) References Cited

U.S. PATENT DOCUMENTS

| 5,446,727 | A | | 8/1995 | Bruckert et al. | |
| 5,479,409 | A | * | 12/1995 | Dupuy et al. | 370/337 |
| 5,668,804 | A | | 9/1997 | Suonvieri | |
| 5,711,003 | A | * | 1/1998 | Dupuy | 455/436 |
| 5,722,074 | A | * | 2/1998 | Muszynski | 455/442 |
| 6,421,334 | B1 | * | 7/2002 | Baines | 370/342 |
| 6,470,001 | B1 | * | 10/2002 | Kim et al. | 370/342 |
| 6,470,057 | B1 | * | 10/2002 | Hui et al. | 375/294 |
| 2001/0029169 | A1 | * | 10/2001 | Agin | 455/88 |
| 2002/0080749 | A1 | * | 6/2002 | Terry | 370/336 |
| 2003/0026239 | A1 | * | 2/2003 | Abe et al. | 370/347 |

FOREIGN PATENT DOCUMENTS

| EP | 0 589 753 A1 | 3/1994 |
| EP | 0 957 592 A2 | 11/1999 |

* cited by examiner

*Primary Examiner*—Matthew D. Anderson
*Assistant Examiner*—Lewis West

(57) ABSTRACT

In a method of adjusting transmit times at the radio interface between network and mobile stations in a mobile radio system adjustments effected by the mobile stations are controlled by the network.

24 Claims, 3 Drawing Sheets

FIG_1
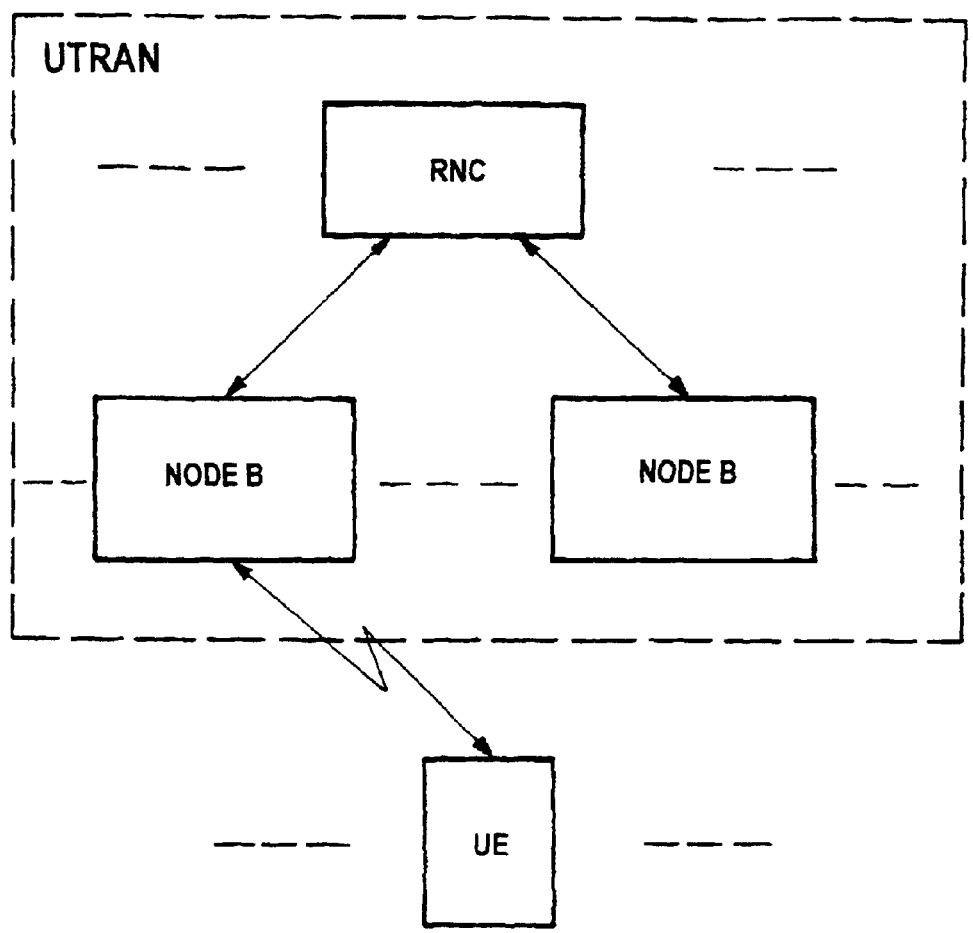

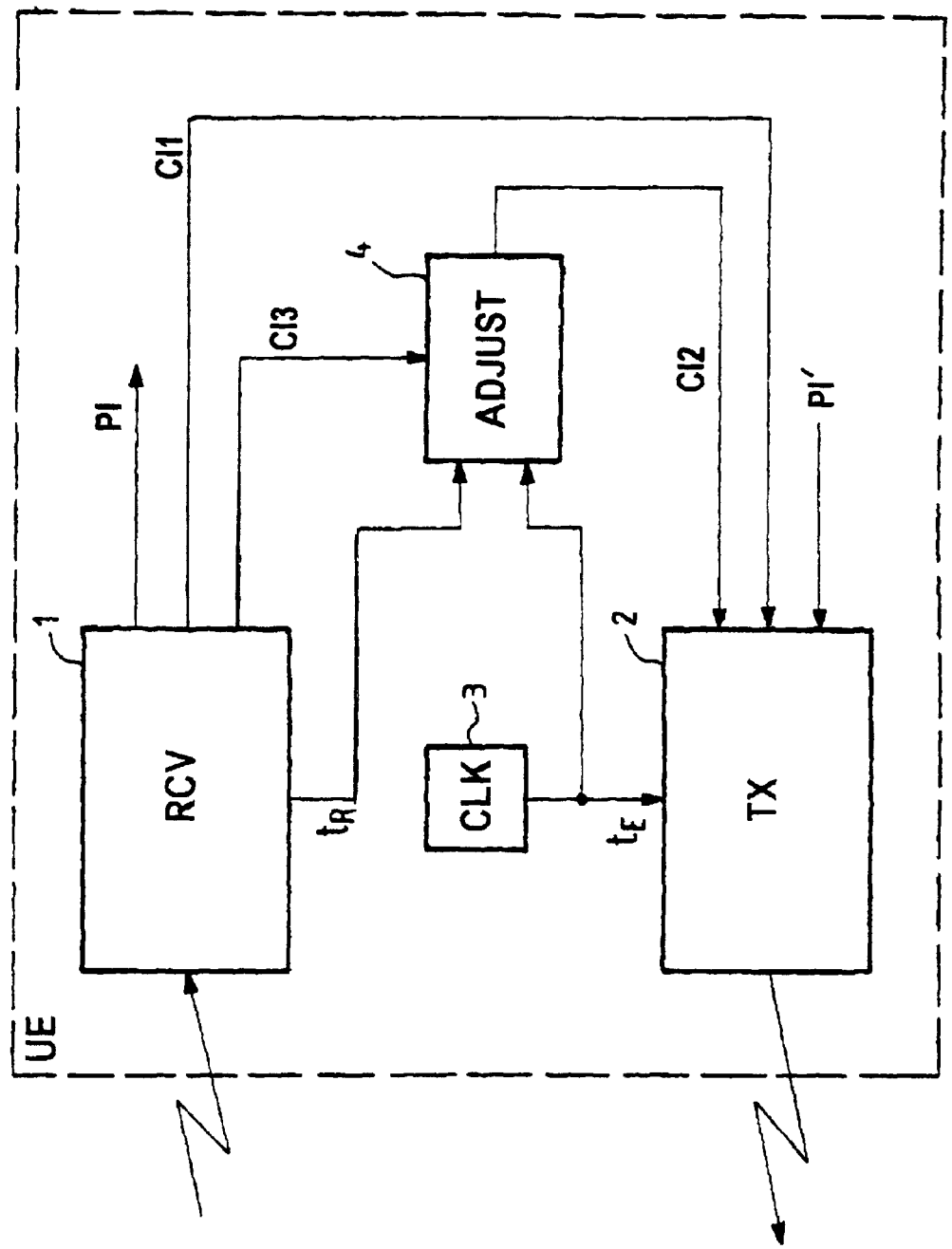
FIG_2

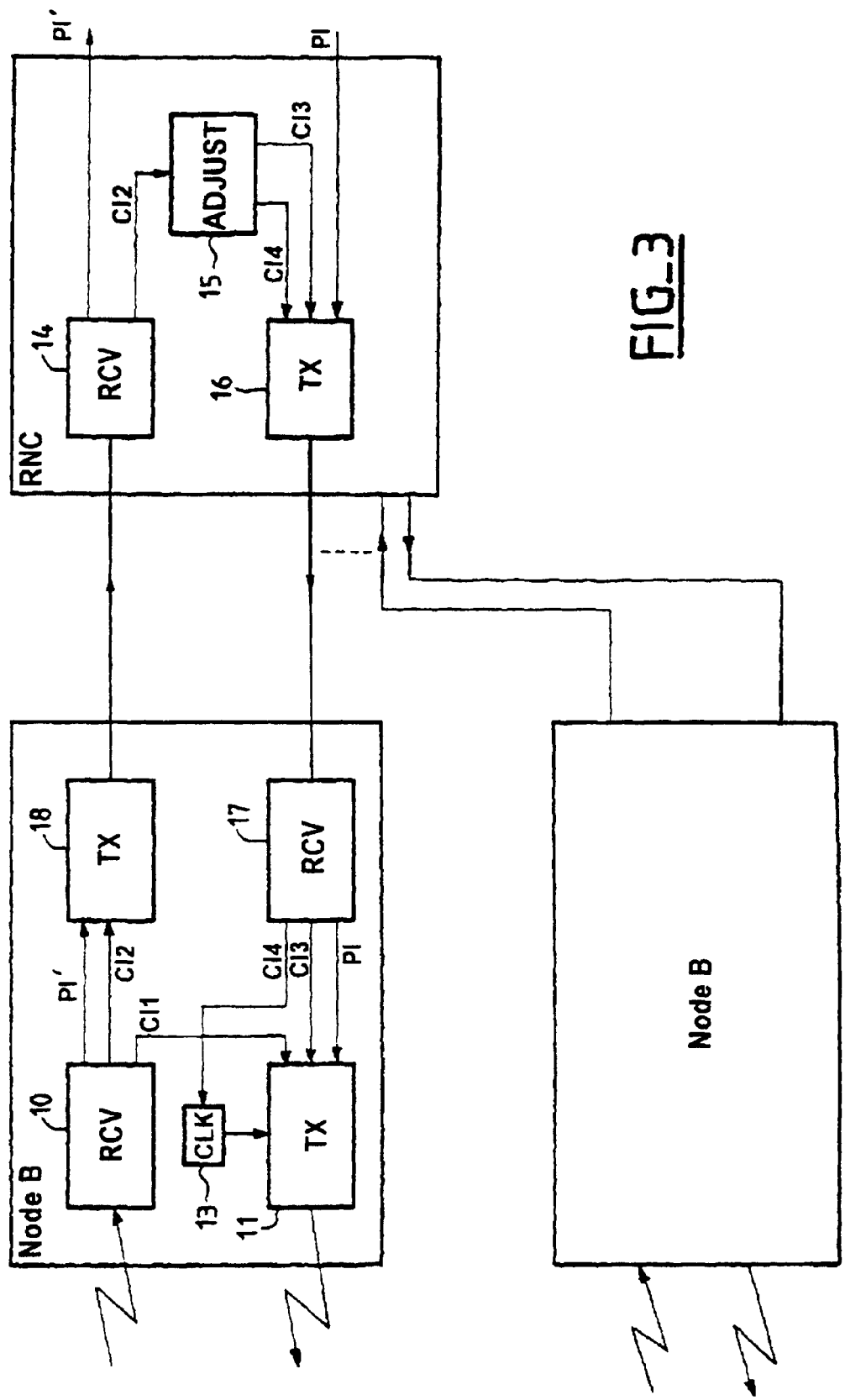
FIG_3

METHOD AND ADJUSTING TRANSMISSION TIMES IN A MOBILE RADIO SYSTEM

BACKGROUND OF THE INVENTION

1. Field of the Invention

The present invention relates generally to mobile radio systems, and in particular to code division multiple access (CDMA) systems.

2. Description of the Prior Art

As a general rule, in CDMA systems, one objective is to improve performance, i.e. in particular to increase capacity and/or improve the quality of service.

One technique that is routinely employed is the power control technique, in particular the closed loop power control technique.

The objective of closed loop power control on a link between a base station and a mobile station is generally to maintain the signal-to-interference ratio (SIR) as close as possible to a target SIR. In the downlink direction, for example, i.e. the direction from a base station to a mobile station, the mobile station transmits to the base station power control commands intended to reduce the difference between the SIR estimated by the mobile station and the target SIR. The target SIR can be determined by another control loop for maintaining a constant quality of service. The second loop is generally referred to as the outer loop, as opposed to the previous loop, which is referred to as the inner loop.

As a general rule, to obtain better performance, the reaction time of the inner power control loop, i.e. the time-delay between the transmission of a signal by the base station and the application by that base station of a corresponding power control command, is advantageously as short as possible.

In systems such as the Universal Mobile Telecommunication System (UMTS), in which the information transmitted is structured in frames which are in turn structured in time slots, a power control command is generally transmitted in each time slot, is generally obtained from the signal received during the preceding time slot, and is generally applied to the signal transmitted during the next time slot.

In theory, this transmission scheme can define a nominal reaction time for the inner power control loop. In practice, because the clocks used in the base stations and the mobile stations to define the above time structure are not stable, and because the mobile stations are moving around, the reaction time can be greater than the nominal reaction time, with the risk of degraded performance. It is then necessary to provide adjustments to prevent degraded performance. Also, the adjustments associated with the stability of the clocks and the speed of the mobile station are merely examples and there are other possible causes of adjustment; for example, the clock of the mobile station and the clock of the base station may not have exactly the same frequency, even if they are very stable.

To determine the adjustments to be effected, the difference between times of reception and transmission by the mobile station can be observed in the mobile station. If that difference departs significantly from a nominal difference T0, an adjustment must be effected.

Another technique routinely employed in mobile radio systems, and in particular in CDMA systems, is the soft handover technique whereby a mobile station communicates simultaneously with several base stations and receive performance can be improved by appropriate techniques of processing and combining the various signals received from the various base stations by the mobile station (in particular using a Rake receiver).

For the UMTS, for example, the 3$^{rd}$ Generation Partnership Project (3GPP) document 3G TS 25.214 V3.1.1 provides for the difference between the times of reception and transmission by the mobile station to remain within limits of T0±ΔT0 where T0 is a nominal difference and T0±ΔT0 corresponds to a receive window around T0. ΔT0 is equal to 148 "chips", for example (in CDMA systems, the term "chip" refers to the unit transmission period after spreading the spectrum of the signal to be transmitted).

An adjustment must also be effected to prevent the times of reception by the mobile station falling outside the receive window for at least one of the base stations with which the mobile station is communicating. Otherwise receive performance may be degraded and the corresponding connection may be lost.

When the various aims of the adjustments have been determined in this way, the problem arises of finding an optimum implementation, given the two types of equipment concerned, namely the mobile stations (referred to as user equipment (UE) in the UMTS), and the base station (referred to as "Node B" in the UMTS), or more generally the combination of the base stations and the units that control them (referred to as "radio network controllers" (RNC) in the UMTS), that combination being referred to as the "UMTS Terrestrial Radio Access Network" (UTRAN) in the UMTS. FIG. 1 outlines the general architecture of this kind of system.

Accordingly, in the current version of the above document, which is version 3G TS 25.214 V3.1.1 (1999-12), the UE is always authorized to adjust its transmit times, even if it is in the "soft handover" situation with base stations that do not have the same time reference (which situation is referred to as "soft handover normal"). If the difference between the UE receive and transmit times is outside the fixed limits, the UE can inform the UTRAN of this, and the latter can then adjust its transmit time.

In a previous version of the above document, the UE was authorized to adjust its transmit times only if it was not in the "soft handover normal" situation.

The reasons for this change to the document are set out in the document TSG-RAN Working Group 1 meeting #9-TSGR1 #9(99) ₁76—Dresden, Germany. A first reason stated, for which the UE must still be authorized to adjust its transmit time, is that in the "soft handover normal" situation this can otherwise lead to abandoning a link which is in fact the better quality link whereas, if the UE is authorized to change its transmit times, it can effect such changes in such a manner as to retain the better quality link and abandon another link of lower quality. A second reason stated is that, because the UE clock is generally much less stable than the network clock, the UE can effect as many changes as are necessary to align its clocks with the network clock and, in the "soft handover normal" situation, avoid requesting the network to effect more adjustments than necessary, causing it to consume more signaling resources than necessary.

It has been observed that the current version of the above document nevertheless has its drawbacks. In particular, in the "soft handover normal" situation, the mobile station runs the risk of modifying its transmit times in the opposite direction to that chosen by the network to modify its own transmit times, which is totally undesirable and can even run the risk of an effect opposite that required from such adjustments. Also, the risk is increased by the fact that the adjustment algorithms implemented in the UTRAN are not standardized and are therefore not known to the mobile stations a priori. In other wards, the essential drawback of this solution is a lack of communication between UE and UTRAN.

The previous version of the above document did not suffer from this drawback. On the other hand, it has also been noted that it had a different drawback, which was that the UE was never authorized to adjust its transmit times in the "soft handover normal" situation, although in some cases it could be beneficial if it were authorized to do so (in particular depending on the type of adjustment algorithm implemented in the UTRAN), or likewise if the LIE were still authorized to effect such adjustments outside the "soft normal handover" situation, whereas in some cases (in particular according to the type of adjustment algorithm implemented in the UTRAN), it could be beneficial for it not to be authorized to do this. In other words, the essential drawback of this solution is a lack of flexibility.

It has also been noted that the two solutions also have the drawback of inflexible or insufficient performance for another reason, which is that in situations where the UE is authorized to effect adjustments, it always effects them the same way, in a predetermined manner, and not in a manner that could be adapted to suit each situation (in particular according to the type of adjustment algorithm implemented in the UTRAN).

One object of the present invention is to avoid these drawbacks.

SUMMARY OF THE INVENTION

The invention provides a method of adjusting transmit times at the radio interface between network and mobile stations in a mobile radio system, in which method adjustments effected by the mobile stations are controlled by the network.

In accordance with another feature, the method uses a command for activating or deactivating the adjustments.

In accordance with another feature, the method uses a maximum amplitude command in respect of the adjustments.

In accordance with another feature, the method uses a maximum frequency command in respect of the adjustments.

In accordance with another feature, the method uses a maximum amplitude command and a maximum frequency command in respect of the adjustments.

In accordance with another feature, the maximum amplitude command in respect of the adjustment caters for a null amplitude corresponding to deactivation of the adjustments.

In accordance with another feature, control information is broadcast on a common signaling channel.

In accordance with another feature, control information is transmitted over a dedicated signaling channel.

In accordance with another feature, the control information is transmitted in a "soft handover" message on a dedicated signaling channel.

In accordance with another feature, the adjustments optimize the reaction time of an inner power control loop.

The present invention also provides an entity or a mobile radio network equipment unit that includes means for transmitting control information for adjusting times of transmission by mobile stations.

The present invention also provides a mobile station that includes means for controlling adjustment of its transmit times as a function of control information received from a network.

The present invention also provides a mobile radio system that includes a mobile radio network including means for transmitting control information for adjustment of times of transmission by mobile stations and mobile stations including means for controlling adjustment of their times of transmission as a function of control information received from the network.

Other objects and features of the present invention will become apparent on reading the following description of embodiments of the invention, which description is given with reference to the accompanying drawings.

BRIEF DESCRIPTION OF THE DRAWINGS

FIG. 1 is a diagram showing the general architecture of a mobile radio system.

FIG. 2 is a diagram showing one example of means to be provided in a mobile station to implement a method according to the invention.

FIG. 3 is a diagram showing one example of means to be provided in a mobile radio network to implement a method according to the invention.

DETAILED DESCRIPTION OF THE PREFERRED EMBODIMENTS

Identical items in the various figures are identified by the same reference numbers.

FIG. 2 shows a mobile station (user equipment) UE including, as known in the art:

receiver means 1 for receiving payload information PI (in the "soft handover" situation, the information is transmitted simultaneously on several downlinks, although this is not specifically illustrated; in the example illustrated, the receiver means 1 also include means known in the art for providing power control command information CI1 in the downlink direction, transmitter means 2 for transmitting payload information PI' in the uplink direction together with the power control command information CI1.

In the example shown in FIG. 2, the mobile station UE also includes adjustment means 4 for:

observing the difference between the times $t_R$ of reception by the mobile station, supplied by the receiver means 1, and the times $t_E$ of transmission by the mobile station supplied by a clock 3, determining if that difference is within a predetermined range [T0−ΔT, T0+ΔT], and if the difference is not within that range, adjusting the transmit times of the mobile station, by means of a corresponding command from the clock 3, and/or transmitting adjustment request information CI2 to the network.

In accordance with the invention, the adjustments effected by a mobile station are controlled by the network. Thus, in the example illustrated by FIG. 2, the adjustment means 4 are controlled by control information CI3 in respect of the adjustments effected by the mobile station, received from the network and supplied by the receiver means 1.

FIG. 3 shows a mobile radio network including a set of base stations Node B controlled by a base station controller (RNC). For simplicity only one base station Node B and one base station controller RNC are shown in detail.

As is known in the art, a base station Node B includes, for receiving/transmitting information at the radio interface from/to mobile stations:

receiver means 10 for receiving payload information PI' from a mobile station UE and power control command information CI1 and adjustment request information CI2 for that mobile station, and transmitter means 11 for transmitting payload information PI to a mobile station with a transmit power that is a function of the power control command information CI1.

In the example illustrated by FIG. 3, an RNC includes, as known in the art, for receiving/transmitting information from/to a Node B:

receiver means 14 for receiving payload information PI' from a Node B and adjustment request information CI2 in respect of a mobile station UE, adjustment means 15 for supplying information CI4 in respect of adjustment commands to be executed in a base station Node B from adjustment request information CI2 in respect of a mobile station UE, and transmitter means 16 for transmitting to a base station Node B payload information PI and the adjustment command information CI4.

In the example illustrated by FIG. 3, a base station Node B further includes, as known in the art, for receiving/transmitting information from/to an RNC:

receiver means 17 for receiving payload information PI from an RNC and adjustment command information CI4 transmitted by that RNC, the information CI4 representing a corresponding adjustment command applied to a clock 13, and transmitter means 18 for transmitting to an RNC payload information PI' and adjustment request information CI2.

In accordance with the invention, the network controls the adjustments effected by the mobile stations. Thus in the example illustrated by FIG. 3, control information CI3 in respect of adjustments effected by a mobile station UE is supplied by the adjustment means 15 in the RNC. In this example, the information CI3 is transmitted to the mobile station UE via the transmitter means 16, then the receiver means 17, and the transmitter means 11.

The control information in respect of the adjustments effected by a mobile station can include, for example:

a command to activate or deactivate adjustments effected by the mobile station, a maximum amplitude command and a maximum frequency command for the adjustments effected by the mobile station (these two parameters are designated (x,y) and the mobile station is authorized to modify its transmit times up to the limit of "x" seconds every "y" seconds, although other units can be used, for example "y" could be expressed as a number of frames), a maximum amplitude command for the adjustments effected by the mobile station, in which case only the parameter "x" is transmitted and the parameter "y" can have a predetermined value, and a maximum frequency command for the adjustments effected by the mobile station, in which case only the parameter "y" is transmitted and the parameter "x" can have a predetermined value.

Note that in the first case (activation or deactivation command), only one bit is needed to transmit the control information, whereas in the other cases several bits are necessary.

It should also be noted that in the case where the parameter "x" is transmitted, it can include a command to deactivate adjustments (corresponding to a value of "x" equal to zero).

Clearly it is not possible to describe here all possible instances of control by the network of adjustments effected by a mobile station. As a general rule, the adjustments generated by a mobile station could be controlled in particular as a function of the adjustments to the network requested by that mobile station and as a function of the algorithm used in the network to effect the adjustments, to obtain one or more of the results previously mentioned.

What is more, the control information in respect of adjustments effected by the mobile station can have a value specific to each mobile station.

For example, that information can be transmitted to all the mobile stations in the same cell by broadcasting it on a common signaling channel such as the broadcast control channel (BCCH) with other system parameters.

They can also be transmitted on a dedicated signaling channel. An interesting example is the use of "soft handover" messages which are used at present to add or remove a cell to or from the set of cells or base stations with which the mobile station communicates in a "soft handover" situation (also referred to as the "active set"). For example, if the network deems it useful, the mobile station can be authorized to deactivate its adjustments when it enters the "soft handover" situation or, and again if the network deems it useful, to reactivate its adjustments when it is no longer in the "soft handover" situation.

Note that the figures described above show a mobile station and a mobile radio network only schematically, to the degree needed to understand the present invention, and without going into the details of the transmission and signaling methods and protocols, which can employ principles that are standard in such systems. Also, FIG. 2 corresponds to only one possible example of the distribution of functions between the various entities or equipment units (in particular Node B and RNC) forming the mobile radio network, and other examples that do not depart from the scope of the invention are of course possible.

What is claimed is:

1. A method of adjusting transmit times at the radio interface between a network and at least one mobile station in mobile radio system, the method comprising:

generating at said mobile station an adjustment command for adjusting said transmit times; and performing adjustments of said transmit times at said mobile station based on said adjustment command, wherein said adjustment command is generated based on adjustment control information received from said network so that said adjustments performed by said mobile station are controlled by said network.

2. The method of claim 1, wherein said adjustment control information comprises a command for activating or deactivating said adjustments.

3. The method of claim 1, wherein said adjustment control information comprises a maximum amplitude command.

4. The method of claim 1, wherein said adjustment control information comprises a maximum frequency command.

5. The method of claim 1, wherein said adjustment control information comprises a maximum amplitude command and a maximum frequency command.

6. The method of claim 5, wherein said maximum amplitude command provides for a null amplitude corresponding to deactivation of said adjustments.

7. The method of claim 1, wherein said adjustment control information is broadcast on a common signaling channel.

8. The method of claim 1, wherein said adjustment control information is transmitted over a dedicated signaling channel.

9. The method claimed in claim 8, wherein said adjustment control information is transmitted in a "soft handover" message on a dedicated signaling channel.

10. The method of claim 1, further comprising:
transmitting adjustment request information from the mobile station to the network.

11. The method of claim 10, further comprising:
generating an adjustment command information at the network based on the adjustment request information; and
adjusting the transmit times at the network based on said adjustment command information generated at the network.

12. The method of claim 11, further comprising:
generating said adjustment command information at a first network entity,
transmitting said generated adjustment command information from said first network entity to a second network entity, and
adjusting the transmit times at the network, at said second network entity.

13. The method of claim 1, further comprising adjusting transmit times at said network based on adjustment requests received from said mobile station.

14. The method of claim 1, wherein said adjustment command is generated in a way as to optimize the reaction time of an inner power control loop.

15. The method of claim 1, further comprising:
determining at the mobile station whether a difference between reception times at the mobile station and transmission times at the mobile station is within a predetermined range; and
generating said adjustment command if the difference is outside of the predetermined range.

16. The method of claim 10, wherein said adjustment request information is generated in a way as to optimize the reaction time of an inner power control loop.

17. The method of claim 10, further comprising:
determining at the mobile station whether a difference between reception times at the mobile station and transmission times at the mobile station is within a predetermined range; and
transmitting adjustment request information from the mobile station to the network if the difference is outside of the predetermined range.

18. A mobile radio network entity configured to generate adjustment control information, wherein said adjustment control information is transmitted to a mobile station which generates an adjustment command for adjusting transmit times, said adjustment command generated at said mobile station being controlled based on said adjustment control information so that adjustments performed by said mobile station are controlled by said network entity.

19. The mobile radio network entity of claim 11, further comprising:
means for generating an adjustment command information for adjusting transmit times at the network based on an adjustment request information received from a mobile station.

20. A mobile station comprising:
means for generating an adjustment command for adjusting transmit times; and
means for performing adjustments of said transmit times based on said adjustment command, wherein said adjustment command is controlled based on adjustment control information received from said network so that said adjustments are controlled by said network.

21. The mobiles station of claim 20, further comprising:
means for generating adjustment request information to be transmitted to said network.

22. The mobile station of claim 21, wherein said means for generated adjustment request information comprises:
means for determining at the mobile station whether a difference between reception times at the mobile station and transmission times at the mobile station is within a predetermined range.

23. The method station of claim 20, wherein said means for generating an adjustment command comprises:
means for determining at the mobile station whether a difference between reception times at the mobile station and transmission times at the mobile station is within a predetermined range; and
means for generating said adjustment command if the difference is outside of the predetermined range.

24. A mobile radio network entity comprising:
means for receiving an adjustment command information generated at the network based on an adjustment request information received from a mobile station, based on a difference between times of reception and transmission by said mobile station; and
means for adjusting transmit times at the network based on said received adjustment command information.

* * * * *